Figure 1:
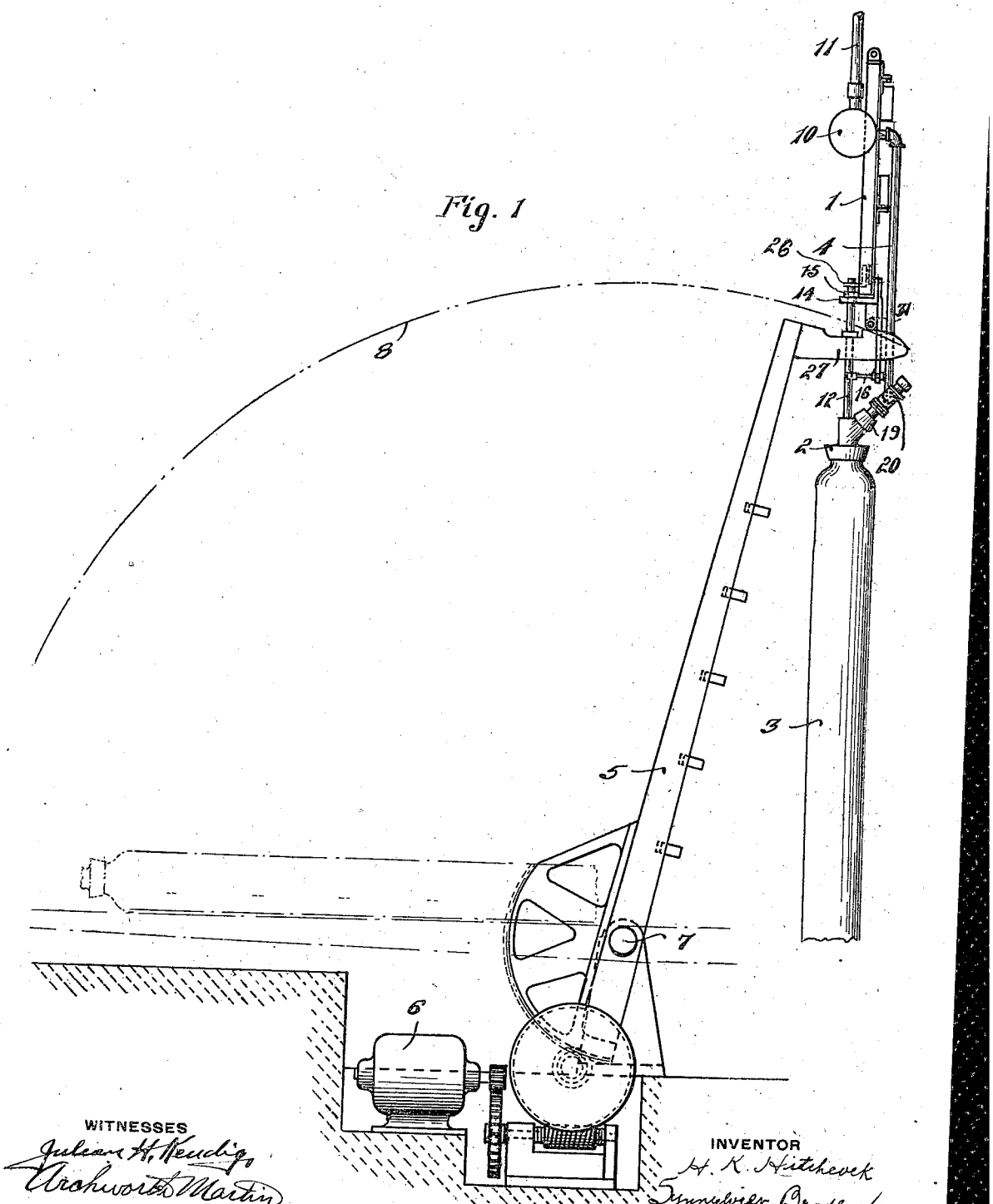

H. K. HITCHCOCK.
APPARATUS FOR DRAWING AND HANDLING GLASS CYLINDERS.
APPLICATION FILED OCT. 1, 1914.

1,170,257.

Patented Feb. 1, 1916.
3 SHEETS—SHEET 1.

WITNESSES

INVENTOR
H. K. Hitchcock

ATTORNEYS

H. K. HITCHCOCK.
APPARATUS FOR DRAWING AND HANDLING GLASS CYLINDERS.
APPLICATION FILED OCT. 1, 1914.
1,170,257.
Patented Feb. 1, 1916.
3 SHEETS—SHEET 2.
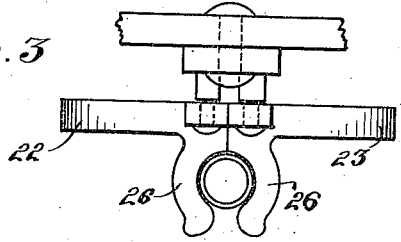
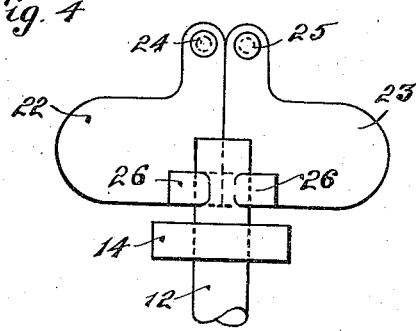
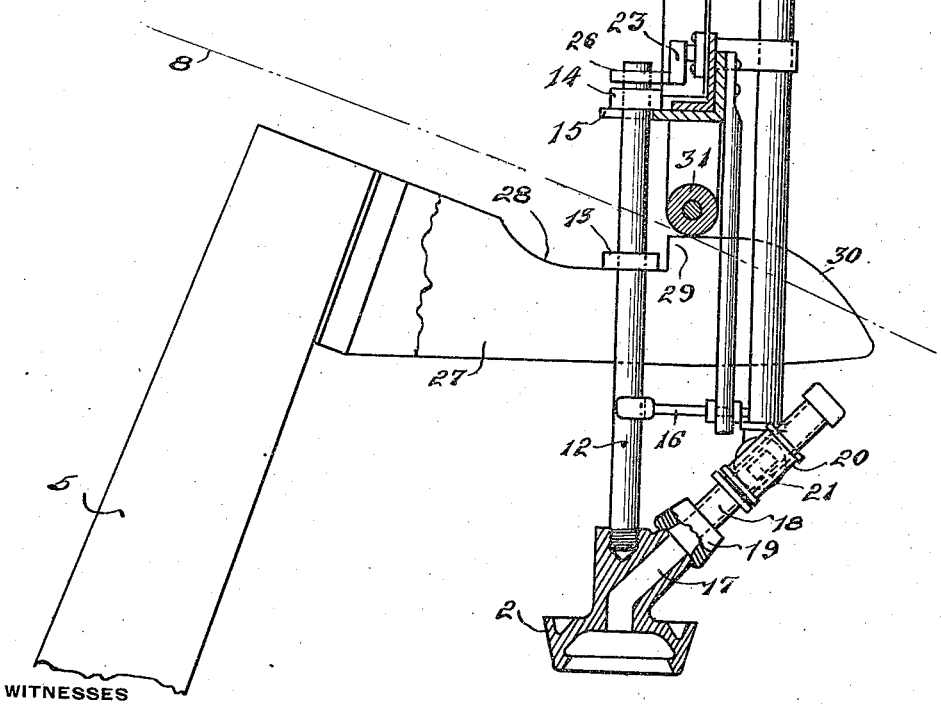
WITNESSES
INVENTOR
H. K. Hitchcock
ATTORNEYS

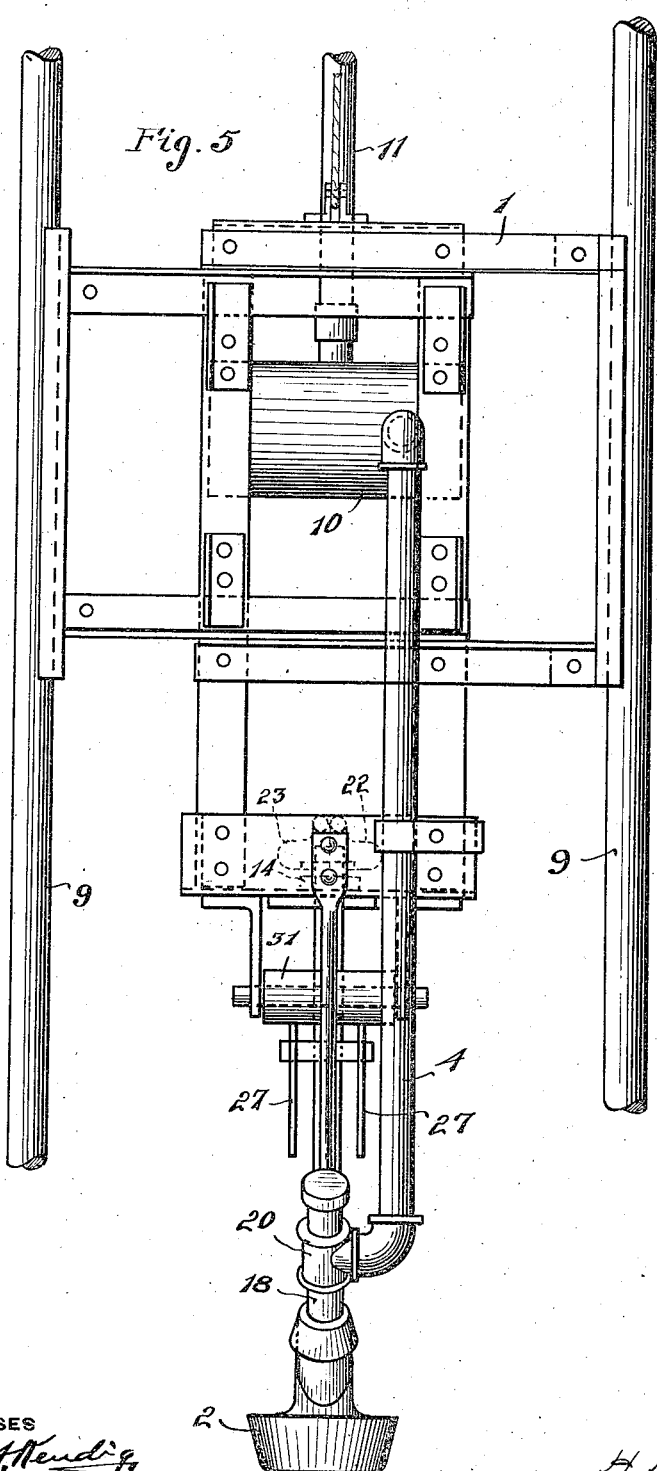

UNITED STATES PATENT OFFICE.

HALBERT K. HITCHCOCK, OF TARENTUM, PENNSYLVANIA, ASSIGNOR TO PITTSBURGH PLATE GLASS COMPANY, OF PITTSBURGH, PENNSYLVANIA, A CORPORATION OF PENNSYLVANIA.

APPARATUS FOR DRAWING AND HANDLING GLASS CYLINDERS.

1,170,257.   Specification of Letters Patent.   Patented Feb. 1, 1916.

Application filed October 1, 1914. Serial No. 864,412.

*To all whom it may concern:*

Be it known that I, HALBERT K. HITCHCOCK, a citizen of the United States, residing at Tarentum, in the county of Allegheny and State of Pennsylvania, have invented a certain new and useful Apparatus for Drawing and Handling Glass Cylinders, of which the following is a specification.

The invention relates to apparatus employed in making glass cylinders and particularly to the bait and the means for handling it. The primary object of the invention is the provision of an apparatus which can be easily and effectively operated to secure the transfer of the bait and cylinder from the drawing carriage to the takedown frame. One embodiment of the invention is illustrated in the accompanying drawings wherein—

Figure 1 is a side elevation of the apparatus showing the general arrangement of the parts, Fig. 2 is a side elevation, with certain of the parts in section, of the portion of the apparatus in which my invention particularly resides, Figs. 3 and 4 are detailed views illustrating the catch employed for holding the bait handle, Fig. 3 being a plan view and Fig. 4 being a front elevation, and Fig. 5 is a rear elevation of the apparatus of Fig. 2.

Referring first to Fig. 1, the principal parts are as follows: 1 is the framework of the drawing carriage, moved upward by any suitable mechanism, (not shown); 2 is the bait upon which is supported the cylinder 3 being drawn; 4 is an inlet pipe by means of which air is conducted to the bait during the drawing operation; and 5 is a swinging takedown frame, operated from the motor 6 by means of the gearing illustrated and pivoted at 7 so that its upper end swings along the arc 8 indicated in dot and dash lines.

The drawing carriage 1 is made of suitable metal sections as indicated in Figs. 2 and 5, and is guided for vertical movement upon the vertical rods 9 (Fig. 5). Carried by the frame is the inlet pipe 4 having its upper end in communication with a drum 10 to which air is supplied from a pipe 11. The bait 2 is provided with a handle 12 carrying fixed thereon the collars 13 and 14. During the drawing operation the collar 14 lies above the laterally opening fork 15 rigidly secured to the drawing carriage. At this time the lower portion of the handle 12 is steadied by means of a fork member 16 also secured to the framework of the carriage.

The upper wall of the bait 2 is provided with an upwardly and laterally extending inlet passage 17, and air is supplied to this passage from the pipe 18 which has a head 19 adapted to fit over the upper end of the passage 17. The pipe 18 is slidably mounted in the T 20, and its weight is such as to secure a sufficiently tight joint between the head 19 and the upper end of the passage 17. The pipe 18 is provided with the slot 21, so that a communication is maintained in its various longitudinal positions between its interior and the supply pipe 4 to which the T 20 is connected.

When the bait handle 12 is in the position illustrated in Fig. 2, with the collar 14 lying above the fork 15, the bait is held releasably against lateral movement by means of the catch illustrated in Figs. 3 and 4, such catch being located above the collar 14. This catch consists of two relatively heavy swinging members 22 and 23 pivoted to the frame at 24 and 25. Each of these members is provided with a finger 26 partially encircling the upper end of the handle 12. When these fingers are in engagement with the handle as indicated in Figs. 3 and 4, any lateral movement of the handle in the fork 15 is yieldingly resisted since in order to release the handle, it is necessary that the handle shall cam the fingers 26 apart and lift the members 22 and 23 against the force of gravity. The arrangement is such however, that when this force is applied to the handle to move it laterally it releases itself automatically from the catch.

The upper end of the takedown 5 is provided with a pair of parallel members 27 constituting a fork and provided upon their upper surfaces with notches 28 for receiving the collar 13. The collar 13 is gotten into the notches 28 in the position indicated in Fig. 2 by drawing the carriage to a point slightly above that illustrated, after which the members 27 are swung into the position illustrated and the carriage allowed to move down slightly so that the collar fits into the notches 28 and behind the shoulders 29 also carried by the members 27 so that any danger of the collar 13 slipping off of the members 27 is avoided. The upper surfaces of the members 27 to the right of the shoulders 29 (Fig. 2) are provided with the cam surfaces 30 adapted to engage the roller 31 carried by the framework of the carriage.

The object of the foregoing arrangement including the cams and the roller is to secure an upward movement of the carriage from the takedown frame corresponding in extent to the upward movement of the bait handle, so that there is no relative movement as between the bait and the carriage, and the collar 14 on the bait handle is therefore released from the fork 15 by sliding laterally over its surface. It will be seen that the cam surfaces 30 bearing against the roller 31 cause the frame 1 and the fork 15 carried thereby to move upward as the frame is swung to the left, at the same rate of speed at which the bait handle is moved upward. After the bait handle is moved out of the fork 15, the receding cam surfaces 30 permit the carriage to move down gradually to its previous position as the frame moves still farther to the left. During the movement of the handle 12 away from the carriage, the catch members 22 and 23 above the collar 14 are released automatically, as is also the connection between the passage 17 and the head 19 of the pipe 18. The entire operation is thus automatic, the upward and lateral movement of the upper end of the takedown frame securing the ready disengagement of all the connecting parts and transferring the weight of the bait and the cylinder from the carriage to the takedown frame without jar or danger or accident of any kind. The catch members 22 and 23, in addition to preventing lateral movement of the handle of the bait, also coöperate with the collar 14 to prevent vertical movement of the handle, so that the bait is guarded in all directions against displacement.

What I claim is:

1. In combination, a drawing carriage, a bait having a laterally extending air supply passage, a handle for the bait supported on the carriage and removable therefrom by a lateral movement in a direction opposite to the direction in which the said air passage extends, an air supply pipe carried by the carriage and having a detachable connection with the air supply passage and disengageable by the lateral movement of the bait, and a takedown apparatus adapted to engage the handle of the bait and remove it laterally from the carriage.

2. In combination, a carriage, a bait having an air passage extending laterally through its wall, an air supply member mounted for lateral movement on the carriage and having its end in yielding engagement with the surface of the bait surrounding the end of said air passage, and a handle extending upwardly from the bait and releasably engaging the carriage.

3. In combination, a carriage, a bait having in its upper wall an oblique air supply passage, an air supply pipe mounted for oblique movement with respect to the carriage and having releasable connection with the air supply passage of the bait, and a handle extending upwardly from the top wall of the bait, and releasably engaging the carriage.

4. In combination, a carriage, a bait provided with a handle having a projection engaged and supported by the carriage, but removable therefrom by a movement laterally and without any substantial upward movement with respect to the carriage, and a catch between the carriage and the handle and just above said projection yieldingly restraining it against movement in a lateral direction.

5. In combination, a carriage provided with a support, a bait provided with a handle engaged by said support, but removable therefrom by a movement laterally, a catch independent of the support between the carriage and the handle and just above said support yieldingly restraining the handle against movement in a lateral direction, and a takedown apparatus adapted to engage the handle of the bait and move it laterally from the support overcoming the restraint of the said catch.

6. In combination, a carriage, a bait with a handle engaged and supported by the carriage, but removable therefrom by a movement laterally, and a takedown member having a movement upward and laterally with respect to the carriage, such member having means for engaging the handle of the bait and for giving the carriage an upward movement corresponding to that imparted to the handle of the bait.

7. In combination, a carriage, a bait with a handle engaged and supported by the carriage, but removable therefrom by a lateral sliding movement, and a takedown frame pivoted so that its upper end swings away from the carriage and upwardly, and provided with means on such end for engaging the handle of the bait, and means whereby the upward movement of the frame imparts an upward movement to the carriage as the bait is moved upwardly and slid laterally.

8. In combination, a carriage provided with a laterally opening bait supporting fork, a bait having a handle fitting into the fork and having a fork engaging member lying above the fork, and a takedown frame pivoted so that its upper end swings away from the carriage and upwardly, and provided with a fork for engaging the bait handle, and cam means, one of whose coöperating parts is carried by the carriage and the other by the upper end of the takedown frame, whereby the upward movement of such end causes a similar upward movement of the carriage while the bait is being moved laterally from the bait supporting fork of the carriage.

9. In combination, a drawing carriage, a bait carried thereby and removable laterally therefrom, a takedown frame pivoted so that its upper end moves upwardly and laterally away from the carriage, means on the said upper end of the frame for engaging the bait, and other means on the frame coöperating with the carriage whereby the upward movement of the said upper end of the frame moves the carriage upward at the same speed at which the bait is moved upwardly by the said upper end of the frame.

10. In combination, a carriage having a fork, a bait provided with a handle carrying a projection engaged and supported by the fork on the carriage but removable therefrom by a movement laterally, and a catch on the carriage just above the projection preventing any substantial upward movement of the handle with respect to the carriage, and yieldingly restraining the handle against lateral movement.

In testimony whereof I have hereunto signed my name in the presence of the two subscribed witnesses.

HALBERT K. HITCHCOCK.

Witnesses:
ARCHWORTH MARTIN,
M. L. JONES.